(12) United States Patent
Melanson

(10) Patent No.: US 8,487,546 B2
(45) Date of Patent: Jul. 16, 2013

(54) LED LIGHTING SYSTEM WITH ACCURATE CURRENT CONTROL

(75) Inventor: John Laurence Melanson, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 722 days.

(21) Appl. No.: 12/339,651

(22) Filed: Dec. 19, 2008

(65) Prior Publication Data
US 2010/0156319 A1 Jun. 24, 2010

Related U.S. Application Data

(60) Provisional application No. 61/092,842, filed on Aug. 29, 2008.

(51) Int. Cl.
*H05B 37/02* (2006.01)
(52) U.S. Cl.
USPC ........... 315/291; 315/294; 315/297; 315/307; 315/312
(58) Field of Classification Search
USPC .......................... 315/291, 297, 312; 323/282
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,414,493 A | 11/1983 | Henrich |
| 4,476,706 A | 10/1984 | Hadden et al. |

(Continued)

FOREIGN PATENT DOCUMENTS

| | | |
|---|---|---|
| EP | 0585789 A1 | 3/1994 |
| EP | 0910168 A1 | 4/1999 |

(Continued)

OTHER PUBLICATIONS

Linear Technology, "Single Switch PWM Controller with Auxiliary Boost Converter," LT1950 Datasheet, Linear Technology, Inc. Milpitas, CA, 2003.

(Continued)

*Primary Examiner* — Douglas W Owens
*Assistant Examiner* — Jonathan Cooper
(74) *Attorney, Agent, or Firm* — Steven Lin, Esq.

(57) ABSTRACT

A light emitting diode (LED) lighting system and method are disclosed. The LED lighting system and method include an LED controller to accurately control a current in an LED system. The LED controller includes components to calculate, based on the current and an active time period of an LED current time period, an actual charge amount delivered to the LED system wherein the LED current time period is duty cycle, modulated at a rate of greater than fifty (50) Hz and to utilize the actual charge amount to modify and provide a desired target charge amount to be delivered during a future active time period of the LED current time period. The LED system and method further involve components to compare the actual charge amount to a desired charge amount for the active time period and compensate for a difference between the actual charge amount and the desired charge amount during the future active time period.

23 Claims, 9 Drawing Sheets

U.S. PATENT DOCUMENTS

| | | | |
|---|---|---|---|
| 4,677,366 A | 6/1987 | Wilkinson et al. |
| 4,683,529 A | 7/1987 | Bucher |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,109,185 A | 4/1992 | Ball |
| 5,121,079 A | 6/1992 | Dargatz |
| 5,206,540 A | 4/1993 | da Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,677,618 A * | 10/1997 | Fiez et al. ............... 323/282 |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,781,040 A | 7/1998 | Myers |
| 5,783,909 A | 7/1998 | Hochstein |
| 5,798,635 A | 8/1998 | Hwang et al. |
| 5,900,683 A | 5/1999 | Rinehart et al. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,150,774 A | 11/2000 | Mueller et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,385,063 B1 | 5/2002 | Sadek et al. |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Melanson et al. |
| 6,753,661 B2 | 6/2004 | Muthu et al. |
| 6,756,772 B2 | 6/2004 | McGinnis |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shytenberg et al. |
| 6,956,750 B1 | 10/2005 | Eason et al. |
| 6,958,920 B2 | 10/2005 | Mednik et al. |
| 6,963,496 B2 | 11/2005 | Bimbaud |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,075,329 B2 | 7/2006 | Chen et al. |
| 7,078,963 B1 | 7/2006 | Andersen et al. |
| 7,088,059 B2 | 8/2006 | McKinney et al. |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shytenberg et al. |
| 7,183,957 B1 | 2/2007 | Melanson |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,288,902 B1 | 10/2007 | Melanson |
| 7,292,013 B1 | 11/2007 | Chen et al. |
| 7,310,244 B2 | 12/2007 | Yang et al. |
| 7,345,458 B2 | 3/2008 | Kanai et al. |
| 7,375,476 B2 | 5/2008 | Walter et al. |
| 7,388,764 B2 | 6/2008 | Huynh et al. |
| 7,394,210 B2 | 7/2008 | Ashdown |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,656,103 B2 | 2/2010 | Shteynberg et al. |
| 7,710,047 B2 | 5/2010 | Shteynberg et al. |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,804,256 B2 | 9/2010 | Melanson |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |

| | | | |
|---|---|---|---|
| 2004/0085117 A1 | 5/2004 | Melbert et al. | |
| 2004/0169477 A1 | 9/2004 | Yancie et al. | |
| 2004/0227571 A1 | 11/2004 | Kuribayashi | |
| 2004/0228116 A1 | 11/2004 | Miller et al. | |
| 2004/0232971 A1 | 11/2004 | Kawasake et al. | |
| 2004/0239262 A1 | 12/2004 | Ido et al. | |
| 2005/0057237 A1 | 3/2005 | Clavel | |
| 2005/0156770 A1 | 7/2005 | Melanson | |
| 2005/0168492 A1 | 8/2005 | Hekstra et al. | |
| 2005/0184895 A1 | 8/2005 | Petersen et al. | |
| 2005/0207190 A1 | 9/2005 | Gritter | |
| 2005/0218838 A1 | 10/2005 | Lys | |
| 2005/0231133 A1* | 10/2005 | Lys | 315/291 |
| 2005/0253533 A1 | 11/2005 | Lys et al. | |
| 2005/0270813 A1 | 12/2005 | Zhang et al. | |
| 2005/0275354 A1 | 12/2005 | Hausman, Jr. et al. | |
| 2005/0275386 A1 | 12/2005 | Jepsen et al. | |
| 2006/0022916 A1 | 2/2006 | Aiello | |
| 2006/0023002 A1 | 2/2006 | Hara et al. | |
| 2006/0125420 A1 | 6/2006 | Boone et al. | |
| 2006/0214603 A1 | 9/2006 | Oh et al. | |
| 2006/0226795 A1 | 10/2006 | Walter et al. | |
| 2006/0238136 A1 | 10/2006 | Johnson, III et al. | |
| 2006/0261754 A1 | 11/2006 | Lee | |
| 2006/0285365 A1 | 12/2006 | Huynh et al. | |
| 2007/0024213 A1 | 2/2007 | Shteynberg et al. | |
| 2007/0029946 A1 | 2/2007 | Yu et al. | |
| 2007/0040512 A1 | 2/2007 | Jungwirth et al. | |
| 2007/0053182 A1 | 3/2007 | Robertson | |
| 2007/0103949 A1 | 5/2007 | Tsuruya | |
| 2007/0124615 A1 | 5/2007 | Orr | |
| 2007/0182699 A1 | 8/2007 | Ha et al. | |
| 2008/0012502 A1 | 1/2008 | Lys | |
| 2008/0043504 A1 | 2/2008 | Ye et al. | |
| 2008/0054815 A1 | 3/2008 | Kotikalapoodi et al. | |
| 2008/0130322 A1 | 6/2008 | Artusi et al. | |
| 2008/0174291 A1 | 7/2008 | Hansson et al. | |
| 2008/0174372 A1 | 7/2008 | Tucker et al. | |
| 2008/0175029 A1 | 7/2008 | Jung et al. | |
| 2008/0192509 A1 | 8/2008 | Dhuyvetter et al. | |
| 2008/0224635 A1 | 9/2008 | Hayes | |
| 2008/0232141 A1 | 9/2008 | Artusi et al. | |
| 2008/0239764 A1 | 10/2008 | Jacques et al. | |
| 2008/0259655 A1 | 10/2008 | Wei et al. | |
| 2008/0278132 A1 | 11/2008 | Kesterson et al. | |
| 2009/0067204 A1 | 3/2009 | Ye et al. | |
| 2009/0147544 A1 | 6/2009 | Melanson | |
| 2009/0174479 A1 | 7/2009 | Yan et al. | |
| 2009/0218960 A1 | 9/2009 | Lyons et al. | |
| 2010/0141317 A1 | 6/2010 | Szajnowski | |

FOREIGN PATENT DOCUMENTS

| | | |
|---|---|---|
| EP | 1014563 | 6/2000 |
| EP | 1164819 A | 12/2001 |
| EP | 1213823 A2 | 6/2002 |
| EP | 1528785 A | 5/2005 |
| EP | 2204905 A1 | 7/2010 |
| GB | 2069269 A | 8/1981 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO 2006/022107 A2 | 3/2006 |
| WO | 2006/067521 A | 6/2006 |
| WO | WO2006135584 | 12/2006 |
| WO | 2007/026170 A | 3/2007 |
| WO | 2007/079362 A | 7/2007 |

OTHER PUBLICATIONS

Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt/://focus.ti.com/lit/ml/slup169/slup169.pdf the whole document.
"HV9931 Unity Power Factor LED Lamp Driver, Initial Release", SUPERTEX Inc., Sunnyvale, CA USA 2005.
AN-H52 Application Note: "HV9931 Unity Power Factor LED Lamp Driver" Mar. 7, 2007, SUPERTEX Inc., Sunnyvale, CA, USA.
Dustin Rand et al: "Issues, Models and Solutions for Triac Modulated Phase Dimming of LED Lamps" Power Electronics Specialists Conferrence, 2007. PESC 2007. IEEE, IEEE, p. 1, Jun. 1, 2007, pp. 1398-1404.
Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search Report PCT/US2008/062387 dated Feb. 5, 2008.
Noon, Jim "UC3855A/B High Performance Power Factor Preregulator", Texas Instruments, SLUA146A, May 1996, Revised Apr. 2004.
International Search Report PCT/GB2006/003259 dated Jan. 12, 2007.
Written Opinion of the International Searching Authority PCT/US2008/056739 dated Dec. 3, 2008.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.
Texas Instruments, Interleaving Continuous Conduction Mode PFC Controller, UCC28070, SLUS794C, Nov. 2007, revised Jun. 2009, Texas Instruments, Dallas TX.
Power Integrations, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.

Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
International Search Report and Written Report PCT US20080062428 dated Feb. 5, 2008.
Prodic, A. et al, "Dead Zone Digital Controller for Improved Dynamic Response of Power Factor Preregulators," IEEE, 2003.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
ON Semiconductor, AND8123/D, Power Factor Correction Stages Operating in Critical Conduction Mode, Sep. 2003.
ON Semiconductor, MC33260, GreenLine Compact Power Factor Controller: Innovative Circuit for Cost Effective Solutions, Sep. 2005.
ON Semiconductor, NCP1605, Enhanced, High Voltage and Efficient Standby Mode, Power Factor Controller, Feb. 2007.
ON Semconductor, NCP1606, Cost Effective Power Factor Controller, Mar. 2007.
ON Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEE Transactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G.Yao et al., Soft Switching Circuit for Interleaved Boost Converters, IEEE Transactions on Power Electronics, vol. 22, No. 1, Jan. 2007.
C. M. De Oliviera Stein et al., A ZCT Auxillary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction of FPGA Implementation, IEEE Transactions on Power Electronics, vol. 21, No. 6, Nov. 6.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 and A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23, 1997-Feb. 27, 1997.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

Fairchild Semiconductor, Application Note 42030, Theory and Application of the ML4821 Average Current Mode PFC Controller, Oct. 25, 2000.

Unitrode Products From Texas Instruments, BiCMOS Power Factor Preregulator, Feb. 2006.

D. Hausman, Lutron, RTISS-TE Operation, Real-Time Illumination Stability Systems for Trailing-Edge (Reverse Phase Control) Dimmers, v. 1.0 Dec. 2004.

International Rectifier, Data Sheet No. PD60230 revC, IR1150(S)(PbF), uPFC One Cycle Control PFC IC Feb. 5, 2007.

Texas Instruments, Application Report SLUA308, UCC3817 Current Sense Transformer Evaluation, Feb. 2004.

Texas Instruments, Application Report SPRA902A, Average Current Mode Controlled Power Factor Correctiom Converter using TMS320LF2407A, Jul. 2005.

Unitrode, Design Note DN-39E, Optimizing Performance in UC3854 Power Factor Correction Applications, Nov. 1994.

Fairchild Semiconductor, Application Note 42030, Theory and Application of the ML4821 Average Currrent Mode PFC Controller, Aug. 1997.

Fairchild Semiconductor, Application Note AN4121, Design of Power Factor Correction Circuit Using FAN7527B, Rev.1.0.1, May 30, 2002.

Fairchild Semiconductor, Application Note 6004, 500W Power-Factor-Corrected (PFC) Converter Design with FAN4810, Rev. 1.0.1, Oct. 31, 2003.

Fairchild Semiconductor, FAN4822, ZVA Average Current PFC Controller, Rev. 1.0.1 Aug. 10, 2001.

Fairchild Semiconductor, ML4821, Power Factor Controller, Rev. 1.0.2, Jun. 19, 2001.

Fairchild Semiconductor, ML4812, Power Factor Controller, Rev. 1.0.4, May 31, 2001.

Linear Technology, 100 Watt LED Driver, Linear Technology, 2006.

Fairchild Semiconductor, FAN7544, Simple Ballast Controller, Rev. 1.0.0, 2004.

Fairchild Semiconductor, FAN7532, Ballast Controller, Rev. 1.0.2, Jun. 2006.

Fairchild Semiconductor, FAN7711, Ballast Control IC, Rev. 1.0.2, Mar. 2007.

Fairchild Semiconductor, KA7541, Simple Ballast Controller, Rev. 1.0.3, 2001.

ST Microelectronics, L6574, CFL/TL Ballast Driver Preheat and Dimming, Sep. 2003.

ST Microelectronics, AN993, Application Note, Electronic Ballast with PFC Using L6574 and L6561, May 2004.

International Search Report and Written Opinion for PCT/US2008/062384 dated Jan. 14, 2008.

S. Dunlap et al., Design of Delta-Sigma Modulated Switching Power Supply, Circuits & Systems, Proceedings of the 1998 IEEE International Symposium, 1998.

Freescale Semiconductor, Inc., Dimmable Light Ballast with Power Factor Correction, Design Reference Manual, DRM067, Rev. 1, Dec. 2005.

J. Zhou et al., Novel Sampling Algorithm for DSP Controlled 2 kW PFC Converter, IEEE Transactions on Power Electronics, vol. 16, No. 2, Mar. 2001.

A. Prodic, Compensator Design and Stability Assessment for Fast Voltage Loops of Power Factor Correction Rectifiers, IEEE Transactions on Power Electronics, vol. 22, No. 5, Sep. 2007.

M. Brkovic et al., "Automatic Current Shaper with Fast Output Regulation and Soft-Switching," S.15.0 Power Converters, Telecommunications Energy Conference, 1993.

Dallas Semiconductor, Maxim, "Charge-Pump and Step-Up DC-DC Converter Solutions for Powering White LEDs in Series or Parallel Connections," Apr. 23, 2002.

Freescale Semiconductor, AN3052, Implementing PFC Average Current Mode Control Using the MC9S12E128, Nov. 2005.

D. Maksimovic et al., "Switching Converters with Wide DC Conversion Range," Institute of Electrical and Electronic Engineer's (IEEE) Transactions on Power Electronics, Jan. 1991.

V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

J. Turchi, Four Key Steps to Design a Continuous Conduction Mode PFC Stage Using the NCP1653, ON Semiconductor, Publication Order No. AND184/D, Nov. 2004.

Megaman, D or S Dimming ESL, Product News, Mar. 15, 2007.

J. Qian et al., New Charge Pump Power-Factor-Correction Electronic Ballast with a Wide Range of Line Input Voltage, IEEE Transactions on Power Electronics, vol. 14, No. 1, Jan. 1999.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.

M. Madigan et al., Integrated High-Quality Rectifier-Regulators, IEEE Transactions on Industrial Electronics, vol. 46, No. 4, Aug. 1999.

T. Wu et al., Single-Stage Electronic Ballast with Dimming Feature and Unity Power Factor, IEEE Transactions on Power Electronics, vol. 13, No. 3, May 1998.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Azoteq, IQS17 Family, IQ Switch®—ProxSense™ Series, Touch Sensor, Load Control and User Interface, IQS17 Datasheet V2.00.doc, Jan. 2007.

C. Dilouie, Introducing the LED Driver, EC&M, Sep. 2004.

S. Lee et al., TRIAC Dimmable Ballast with Power Equalization, IEEE Transactions on Power Electronics, vol. 20, No. 6, Nov. 2005.

L. Gonthier et al., EN55015 Complaint 500W Dimmer with Low-Losses Symmetrical Switches, 2005 European Conference on Power Electronics and Applications, Sep. 2005.

Why Different Dimming Ranges? The Difference Between Measured and Perceived Light, 2000 http://www.lutron.com/ballast/pdf/LutronBallastpg3.pdf.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
SUPERTEX Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
SUPERTEX Inc., HV9931 Unity Power Factor LED Lamp Driver, Application Note AN-H52, Mar. 7, 2007.
SUPERTEX Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F800/E, Jul. 2005.
International Search Report for PCT/US2008/051072, mailed Jun. 4, 2008.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.

* cited by examiner

LED LIGHTING SYSTEM WITH ACCURATE CURRENT CONTROL

CROSS REFERENCE TO RELATED APPLICATIONS

This application claims the benefit under 35 U.S.C. §119(e) and 37 C.F.R. §1.78 of U.S. Provisional Patent Application No. 61/092,842, filed Aug. 29, 2008 and entitled "Duty Cycle Dimming".

U.S. Provisional Application No. 60/909,458, entitled "Ballast for Light Emitting Diode Light Sources," inventor John L. Melanson, and filed on Apr. 1, 2007 describes exemplary methods and systems and is incorporated by reference in its entirety. Referred to herein as "Melanson I".

U.S. patent application Ser. No. 12/047,249, entitled "Ballast for Light Emitting Diode Light Sources," inventor John L. Melanson, and filed on Mar. 12, 2008 describes exemplary methods and systems and is incorporated by reference in its entirety. Referred to herein as "Melanson II".

U.S. patent application Ser. No. 12/047,269, entitled "Lighting System with Power Factor Correction Control Data Determined from a Phase Modulated Signal," inventor John L. Melanson, and filed on Mar. 12, 2008 describes exemplary methods and systems and is incorporated by reference in its entirety. Referred to herein as "Melanson III".

U.S. patent application Ser. No. 11/695,024, entitled "Lighting System with Lighting Dimmer Output Mapping," inventors John L. Melanson and John Paulos, and filed on Apr. 1, 2007 describes exemplary methods and systems and is incorporated by reference in its entirety. Referred to herein as "Melanson IV".

U.S. patent application Ser. No. 11/864,366, entitled "Time-Based Control of a System having Integration Response," inventor John L. Melanson, and filed on Sep. 28, 2007 describes exemplary methods and systems and is incorporated by reference in its entirety. Referred to herein as Melanson V.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson VI.

U.S. patent application Ser. No. 11/967,271, entitled "Power Factor Correction Controller with Feedback Reduction," inventor John L. Melanson, and filed on Dec. 31, 2007 describes exemplary methods and systems and is incorporated by reference in its entirety. Referred to herein as Melanson VII.

U.S. patent application Ser. No. 11/967,273, entitled "System and Method with Inductor Flyback Detection Using Switch Gate Charge Characteristic Detection," inventor John L. Melanson, and filed on Dec. 31, 2007 describes exemplary methods and systems and is incorporated by reference in its entirety. Referred to herein as Melanson VIII.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson IX.

U.S. patent application Ser. No. 11/967,272, entitled "Power Factor Correction Controller With Switch Node Feedback", inventor John L. Melanson, and filed on Dec. 31, 2007 describes exemplary methods and systems and is incorporated by reference in its entirety. Referred to herein as Melanson X.

U.S. patent application Ser. No. 12/058,971, entitled "LED Lighting System with a Multiple Mode Current Control Dimming Strategy", inventor John L. Melanson, and filed on Mar. 31, 2008 describes exemplary methods and systems and is incorporated by reference in its entirety. Referred to herein as Melanson XI.

BACKGROUND OF THE INVENTION

1. Field of the Invention

The present invention relates in general to the field of electronics and lighting, and, more specifically, to a light emitting diode (LED) system and method with accurate current control.

2. Description of the Related Art

Commercially practical incandescent light bulbs have been available for over 100 years. However, other tight sources show promise as commercially viable alternatives to the incandescent light bulb. LEDs are becoming particularly attractive as main stream; light sources in part because of energy savings through high efficiency light output and environmental incentives such as the reduction of mercury.

LEDs are semiconductor devices and are driven by direct current. The lumen output intensity (i.e. brightness) of the LED approximately varies in direct proportion to the current flowing through the LED. Thus, increasing current supplied to an LED increases the intensity of the LED and decreasing current supplied to the LED dims the LED, i.e. decreases the brightness of the LED. Current can be modified by either directly reducing the direct current level to the white LEDs or by reducing the average current through duty cycle modulation.

Dimming a light source saves energy when operating a light source and also allows a user to adjust the intensity of the light source to a desired level. Many facilities, such as homes and buildings, include light source dimming circuits (referred to herein as "dimmers").

FIG. 1 depicts an LED lighting system 100 that supplies power to light emitting diodes (LEDs) 102 and dims the LEDs 102 in accordance with a dimming level indicated by the phase modulated signal $V_\Phi$. The Voltage source 104 supplies an alternating current (AC) input voltage $V_{IN}$. Full, diode bridge rectifier 108 rectifies the input voltage $V_{IN}$. The mains voltage source 104 is, for example, a public utility, and the input voltage $V_{DIM}$ is, for example, a 60 Hz/120 V rectified voltage in the United States of America or a 50 Hz/230 V rectified voltage in Europe. The dimmer 106 is, for example, a phase cut dimmer that generates phase delays in the rectified input voltage $V_{IN}$ to generate phase modulated signal $V_\Phi$. The phase delays indicate dimming levels. Generally, as the phase delays increase, the dimming level decreases, i.e. as the phase delays increase, the dimming level indicates a lower brightness level for LEDs 102. The Background sections of Melanson I, Melanson II, and Melanson III, describe examples of dimmer 106.

Switching power supply 110 utilizes switching power converter technology to convert the phase modulated signal $V_\Phi$ into an output voltage $V_{OUT}$. The output voltage $V_{OUT}$ is sufficient to bias the LEDs 102. Switching power supply 110 also supplies an LED current $i_{LED}$ to illuminate the LEDs 102.

Current controller 112 controls active and average values of LED current $i_{LED}$ by controlling the conductivity of n-channel field effect transistor (FET) Q1. Current controller 112 generates a gate control signal $C_{G0}$ to charge and discharge a gate of FET Q1. The control signal $C_{G0}$ has two relevant frequencies, an active frequency and a duty cycle modulated frequency. During an active period of LED current $i_{LED}$, the control signal $C_{G0}$ has an active frequency in the range of, for example, 20 kHz to 500 kHz. As described subsequently in more detail, the duty cycle modulated frequency is less than the active frequency. The active period of LED current $i_{LED}$ is the period of time when the average value of LED current $i_{LED}$ equals current value $i_{FULL}$. The time period for this average is, for example, one or a few (such as 3-5) periods of the active frequency.

When the control signal $C_{G0}$ is a logical "one", FET Q1 conducts, i.e. is "ON", and when the control signal $C_{G0}$ is a logical "zero", FET Q1 is nonconductive, i.e. is "OFF". When the FET Q1 is "ON", diode D1 is reversed bias and, LED current $i_{LED}$ flows through the LEDs 102 and charges inductor $L_1$. When FET Q1 is "OFF", the voltage across inductor $L_1$ changes polarity, and diode $D_1$ creates a current path for the LED current $i_{LED}$. The inductor $L_1$ is chosen so as to store enough energy to maintain an approximately constant active value of LED current $i_{LED}$ when MOSFET Q1 is "OFF". Capacitor C1 helps "smooth" LED current $i_{LED}$. As subsequently explained in more detail, the active value of the LED current $i_{LED}$ is the average LED current $i_{LED}$ when the current control system 112 is active, i.e. during the active period of LED current $i_{LED}$. The LED current $i_{LED}$ includes a ripple 201 due to, for example, the charging and discharging of inductor L1. The frequency of the ripple 201 is the active frequency. It is desirable, for LED efficiency, to keep the LED current relatively constant, to reduce heating effects.

FIG. 2 depicts a graphical representation 200 of the LED current $i_{LED}$ for various dimming levels indicated by the phase modulated signal $V_\Phi$. Referring to FIGS. 1 and 2, when the phase modulated signal $V_\Phi$ indicates a full dimming level, i.e. full brightness for LEDs; 102, current controller 112 controls the LED current $i_{LED}$ so that the active value of LED current $i_{LED}$ is continuous and constant over time and equals $i_{FULL}$, as indicated by LED current $i_{LED}$ waveform 202. "$i_{FULL}$" represents the active value of LED current $i_{LED}$ that causes the LEDs 102 to illuminate at full brightness.

The current controller 112 uses feedback information from feedback signal $LEDi_{sense}$ to sense the active value of LED current $i_{LED}$. The feedback signal $LEDi_{sense}$ represents a voltage $V_{fb}$ across sense resistor $R_{SENSE}$. The voltage $V_{fb}$ represents LED current $i_{LED}$ when FET Q1 is ON. Thus, from the feedback signal $LEDi_{sense}$, the current controller 112 obtains the value of LED current $i_{LED}$ and can adjust the duty cycle of control signal $C_{G0\_FULL}$ to maintain the active value of LED current $i_{LED}$ at the full active value $i_{FULL}$ during the active period of LED current $i_{LED}$. As subsequently explained in more detail, the control signal $C_{G0\_FULL}$ is also duty cycle modulated at the duty cycle modulation frequency in response to dimming levels indicated by phase modulated signal $V_\Phi$ to generate control signal $C_{G0}$.

To determine the dimming level indicated by phase modulated signal $V_\Phi$, comparator 114 compares the phase modulated signal $V_\Phi$ with a phase delay detection reference signal $V_{DET}$. The value of phase delay detection reference signal $V_{DET}$ is set to detect an edge of any phase delays in the phase modulated signal $V_\Phi$. Generally, the edge of any phase delays during each cycle of phase modulated signal $V_\Phi$ results in a voltage increase in phase modulated signal $V_\Phi$. Thus, generally, the value of phase delay detection reference signal $V_{DET}$ is set low enough, so that the output of comparator 114 changes from a logical 0 to a logical 1 when a rising edge associated with an end to a phase delay is detected and changes to a logical 0 if a phase delay is detected during a cycle of phase modulated signal $V_\Phi$.

Comparator 114 generates a duty cycle modulated enable signal EN at the duty cycle modulation frequency. The duty cycle of enable signal EN corresponds to the dimming level indicated by phase modulated signal $V_\Phi$. The current controller 112 responds to the enable signal EN by duty cycle modulating the control signal $C_{G0}$ so that the average value, $i_{LED\_AVG}$, of LED current $i_{LED}$ varies in accordance with dimming levels indicated by the phase modulated signal $V_\Phi$. Modulator 116 represents a logical representation of utilizing the enable signal EN to generate a duty cycle modulated control signal $C_{G0}$. The enable signal EN represents one input signal to AND gate 118, and control signal $C_{G0\_FULL}$ represents another input signal to AND gate 118. The AND gate 118 is exemplary. In typical applications, the function of the AND gate 118 is integrated into the logic of the controller 112. Control signal $C_{G0\_FULL}$ corresponds to control signal $C_{G0}$ during the active period of LED current $i_{LED}$. When the enable signal EN is a logical 1, the control signal $C_{G0}$ equals the control signal $C_{G0\_FULL}$. When the enable signal EN is a logical 0, the control signal $C_{G0}$ equals 0. Thus, the control signal $C_{G0}$ is duty cycle modulated to generate the control signal $C_{G0\_FULL}$ and is duty cycle modulated in response to the phase modulated signal $V_\Phi$.

For example, referring to LED current $i_{LED}$ waveform 204, when the phase modulated signal $V_\Phi$ indicates a ¾ dimming level, the duty cycle of enable signal EN is 0.75. The enable signal EN causes the current controller 112 to duty cycle modulate the control signal $C_{G0}$ with the same duty cycle as enable signal EN so that time period $T_{ACTIVE\_3/4}$/T equals 0.75. Thus, the active period of LED current $i_{LED}$ equals $T_{ACTIVE\_3/4}$ for each period T of phase modulated signal $V_\Phi$ while the phase modulated signal $V_\Phi$ indicates a ¾ dimming level. Period T represents a duty cycle modulated period, and the duty cycle modulated frequency equals 1/T. The average LED current $i_{LED\_AVG}$ equals $i_{FULL}$ (the active value of LED current $i_{LED}$) times the duty cycle of enable signal EN. For a ¾ dimming level, the average LED current $i_{LED\_AVG}$ equals $0.75 \cdot i_{FULL}$. During the inactive period of LED current $i_{LED}$, i.e. between the end of the active period $T_{ACTIVE\_3/4}$ and the beginning of the next period of phase modulated signal $V_\Phi$, the LED current $i_{LED}$ is zero.

Referring to LED current $i_{LED}$ waveform 206, when the phase modulated signal $V_\Phi$ indicates a ⅛ dimming level, the duty cycle of enable signal EN is 0.125. The enable signal EN causes the current controller 112 to duty cycle modulate the control signal $C_{G0}$ with the same duty cycle as enable signal EN so that time period $T_{ACTIVE\_1/8}$/T equals 0.125. Thus, the active period of LED current $i_{LED}$ equals $T_{ACTIVE\_1/8}$ for each period T of phase modulated signal $V_\Phi$ while the phase modulated signal $V_\Phi$ indicates a ⅛ dimming level. The average LED current $i_{LED\_AVG}$ equals $i_{FULL}$ times the duty cycle of enable signal EN. For a ⅛ dimming level, the average LED current $i_{LED\_AVG}$ equals 0.125 $i_{FULL}$. During the inactive period of LED current $i_{LED}$, i.e. between the end of the active period $T_{ACTIVE\_1/8}$ and the beginning of the next period of phase modulated signal $V_\Phi$, the LED current $i_{LED}$ is zero.

Dimmable LED systems are typically driven with a Pulse Width Modulation (PWM) controlling a constant-current source, and the PWM duty cycle is modified to select the dimming level. The constant current source is either linear or a switch-mode controller. For most high powered LED applications, such as general lighting, system efficiency is a critical characteristic, and a switch-mode controller is used. The switching frequency $f_{SW}$ of the controller is typically in the range of 20 kHz to 1+ MHz. Examples of switch mode controllers would be the Sipex Corporation SP6652 and the National Instruments LM3407. The datasheets for Sipex Corporation SP6652 and National Instruments LM3407 respectively dated May 25, 2007 and Jan. 18, 2008 are hereby incorporated by reference.

Referring now to FIG. 3, an exemplary plot 300 of an Enable signal EN, output voltage $V_{out}$, and LED current $I_{LED}$ against dimming voltage values is shown for the Sipex SP6652. Exemplary ramp-up 302 of an active period for LED current $I_{LED}$ is shown in plot 300. In FIG. 3, the voltage $V_{IN}$ is 4.2 Volts, $V_0$ is 3.3 Volts, $I_{out}$ is 600 mA, $R_{sense}$ equals 4 kohm, and $L_1$ equals 4.7 microH. Furthermore, referring now to FIG. 4, another exemplary plot 400 of an Enable signal EN, output voltage $V_{out}$, and LED current $I_{LED}$ against dimming voltage values is shown for the Sipex SP6652. Another exemplary ramp-up 402 of an active period for LED current $I_{LED}$ is shown in plot 400. In FIG. 4, the voltage $V_{IN}$ is 4.2 Volts, $V_0$ is 1.5 Volts, $I_{out}$ is 600 mA, $R_{sense}$ equals 4 kohm, and $L_1$ equals 4.7 microH. As shown in plots 300 and 400, the shape of LED current $I_{LED}$ is not controlled very well.

Referring now to FIG. 5, an exemplary plot 500 of Enable signal $V_{EN}$, output voltage $V_{LED}$, and LED current $I_{LED}$ against time is shown for the National Semiconductor LM3407. Specifically in plot 500, enabling of dimming is shown, and exemplary current ramp-up 502 of an active period for LED current $I_{LED}$ is shown. Referring now to FIG. 6, an exemplary plot 600 of Enable signal $V_{EN}$, output voltage $V_{LED}$, and LED current $I_{LED}$ against time is shown for the National Semiconductor LM3407. Specifically in plot 600, disabling of dimming is shown, and exemplary current ramp-down 602 of the same active period for LED current $I_{LED}$ as shown in plot 500 is shown.

The switch mode controllers (e.g., Sipex SP6652 and National Semiconductor LM3407) have an enable input signal (e.g., Enable signal EN or $V_{EN}$) that is pulsed for PWM operation. Ideally, a desired amount of charge for each active time period for LED current $I_{LED}$ is desired to be provided to the LED system. However, due to limitations of quantizing charge in discrete time, providing an ideal desired amount of charge for an active time period for LED current $I_{LED}$ to an LED system is very hard or impossible to achieve. Such non-idealities are in itself due to the nature of charge quantization (e.g., charge quantizing cycles). The inherent problem of quantizing cycles of charge is that it is limited to the exactness of the amount of charge of LED current $I_{LED}$ being provided to the LED system due to the fact that charge is quantized in discrete amounts based on discrete time. For example, the geometric points in time of when LED current $I_{LED}$ ramp-up (e.g., slope 502) and ramp-down (e.g., slope 602) and the cycle rate at which the LED current $I_{LED}$ fluctuates at an average peak current value in accordance with the values of pulses of a control signal limit the exactness of the amount of charge being provided. Also, temperature variations, power supply variations, LED aging, etc. also impact the accuracy of the amount of charge being delivered to an LED system.

Also, too slow of a PWM operation frequency (e.g., below 200 Hz) for pulsing the enable input signal can be perceived as a flicker of the LED of a dimmable LED lighting system. Furthermore, operation below a PWM frequency of 20 kHz for pulsing the enable input signal has the potential to create audio tones due to acoustic behavior of magnetic material, which is undesirable and can lead to higher cost to ameliorate the sound path.

On the other hand, an overly fast PWM operation frequency for pulsing the enable input signal runs into a problem with the start-up and shut down of the current controller. For example, it may take 0.1 milliseconds to 1 millisecond to turn on and off the current. At high PWM operation frequencies, many other negative effects that the dimmable LED lighting system may encounter are the non-uniform dimming control, unpredictable control, and non-linear behavior. In applications with multiple LED colors, the balance between a slow and fast PWM operation frequency is important to the resulting color, and these issues severely limit the ability to provide a desired resulting color.

There are also other modes of dimming that modify the intensity in ways other than by PWM operation that have desirable characteristics. One of the ways includes the use of delta-sigma modulation. However, the use of delta-sigma modulation would be impractical with the slow behavior of the controller. Thus, a control system that can operate linearly across wide dimming frequency ranges while maintaining high efficiency is desired and needed.

SUMMARY OF THE INVENTION

In one embodiment of the present invention, a light emitting diode (LED) lighting system includes an LED controller to control a current in an LED system. The LED controller includes components to calculate, based on the current and an active time period of an LED current time period, an actual charge amount delivered to the LED system and utilize the actual charge amount to modify and provide a desired target charge amount to be delivered during a future active time period of the LED current time period. The LED system can also have components to compare the actual charge amount to a desired charge amount for the active time period and compensate, for a difference between the actual charge amount and the desired charge amount during the future active time period.

In another embodiment of the present invention, a method of controlling a current in an LED system of an LED lighting system is disclosed. The method includes calculating, based on the current and an active time period of an LED current time period, an actual charge amount delivered to the LED system and utilizing the actual charge amount to modify and provide a desired target charge amount to be delivered during a future active time period of the LED current time period. The method can further include comparing the actual charge amount to a desired target charge amount for the active time period and compensating for a difference between the actual charge amount and the desired charge amount during the future active time period.

In a further embodiment of the present invention, a current controller for controlling current to an LED system for an LED lighting system is disclosed. The current controller includes components for receiving a dimming level signal from a dimming controller and for controlling and providing, based on the dimming level signal, an amount of drive current for driving the LED system. The components are at least part of an LED controller to calculate, based on the current and an active time period of the LED current time period, an actual charge amount delivered to the LED system and to utilize the actual charge amount to modify and provide a desired target charge amount to be delivered during a future active time period of the LED current time period.

In a still further embodiment, a method for controlling current to an LED system for an LED lighting system is disclosed. The method includes receiving a dimming level signal from a dimming controller and controlling and providing, based on the dimming level signal, an amount of drive current for driving the LED system. The receiving and controlling and providing steps are at least part of an LED controller method to calculate, based on the current and an active time period of the LED current time period, an actual charge amount delivered to the LED system and to utilize the actual charge amount to modify and provide a desired target charge amount to be delivered during a future active time period of the LED current time period.

In yet another embodiment, a delta-sigma modulator dimming controller for controlling a dimming level of an LED system for an LED lighting system is disclosed. The delta-sigma modulator dimming controller includes components for receiving a dimming control signal and driving a dimming level signal to a current controller for providing a current for driving the LED system. The components are at least part of an LED controller to calculate, based on the current and an active time period of an LED current time period, an actual charge amount delivered to the LED system and to utilize the actual charge amount to modify and provide a desired target charge amount to be delivered during a future active time period of the LED current time period.

In still yet another embodiment, a method for controlling a dimming level of an LED system for an LED lighting system utilizing a delta sigma modulator is disclosed. The method includes receiving a dimming control signal and driving a dimming level signal to a current controller for providing a current for driving the LED system. The receiving and driving steps are at least part of an LED controller method to calculate, based on the current and an active time period of an LED current time period, an actual charge amount delivered to the LED system and to utilize the actual charge amount to modify and provide a desired target charge amount to be delivered during a future active time period of the LED current time period.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A light emitting diode (LED) lighting system includes an LED controller to accurately control a current in an LED system. The LED controller includes components to calculate, based on the current and an active time period of an LED current time period, an actual charge amount delivered to the LED system wherein the LED current time period is duty cycle modulated at a rate of greater than fifty (50) Hz and to utilize the actual charge amount to modify and provide a desired target charge amount to be delivered during a future active time period of the LED current time period. The LED system further has components to calculate for an active time period of the LED current time period an actual charge amount delivered to the LED system and also has components to compare the actual charge amount to a desired charge amount for the active time period of the LED current time period and compensate for a difference between the actual charge amount and the desired charge amount during the future active time period. By being able to accurately control the desired charge amount, the average LED current is better controlled, and thus, the light intensity of the LED(s) is more effectively controlled.

The accurate control and charge compensation of the LED current in this manner and in accordance with the principles of the present invention allows the LED lighting control system to operate linearly across wide dimming ranges while maintaining high efficiency. By accurately controlling and charge compensating the LED current, flicker caused by a slow PWM operation frequency (e.g., below 200 Hz) for pulsing the enable input signal can be avoided. Additionally, start-up and shut down problems caused by an overly fast PWM operation frequency for pulsing the enable input signal are also avoided by accurately calculating charge compensation for the LED current. Other negative effects caused by an overly fast PWM operation frequency, such as non-uniform dimming control, unpredictable, control, and non-linear behavior, are also eliminated because of the accurate control and charge compensation of the LED current. By being able to accurately balance a slow and fast PWM operation frequency, the ability to provide a desired resulting LED color is no longer limited.

Figure 1:
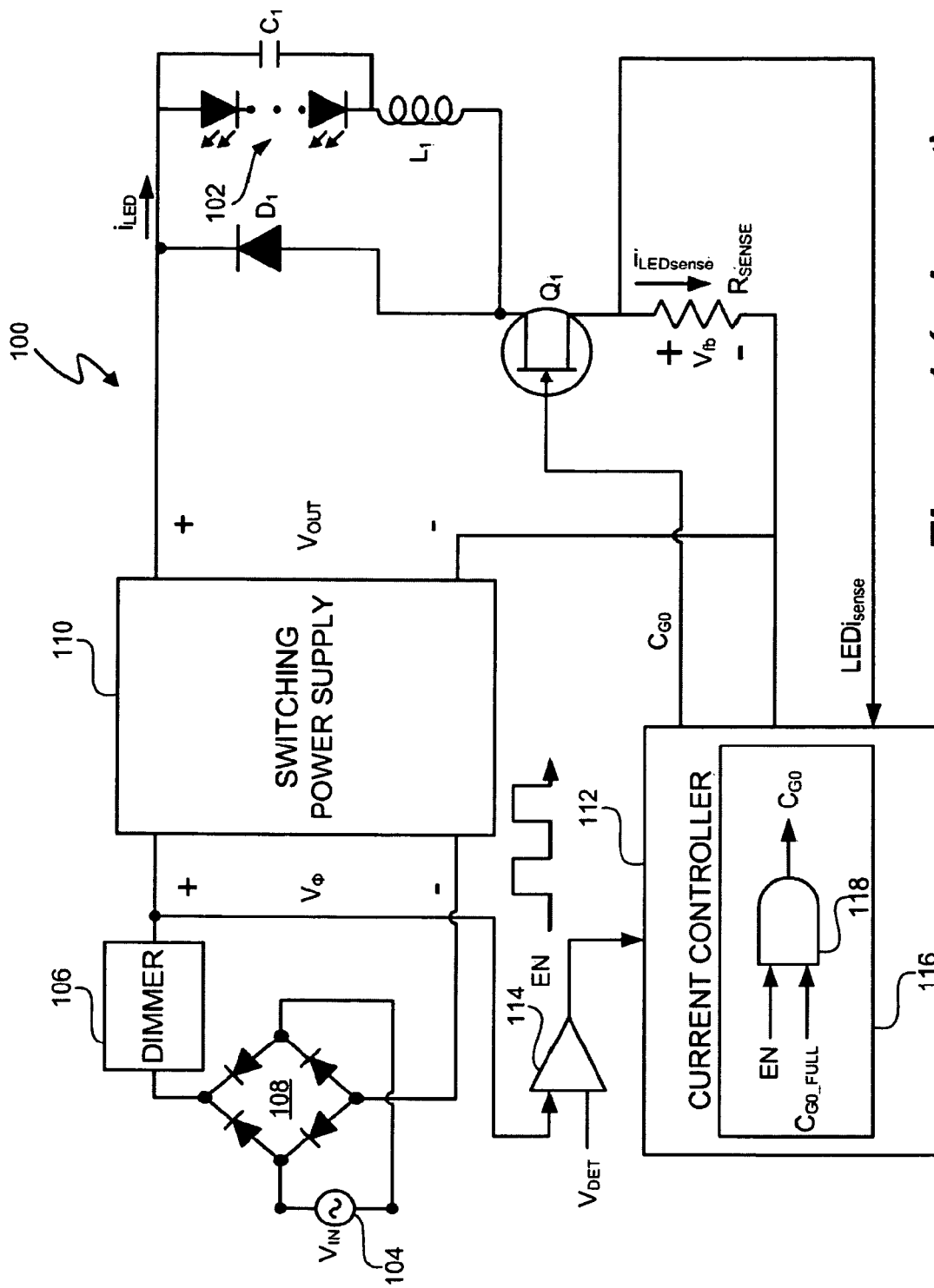
FIG. 1 (labeled prior art) depicts an LED lighting system.
Figure 2:
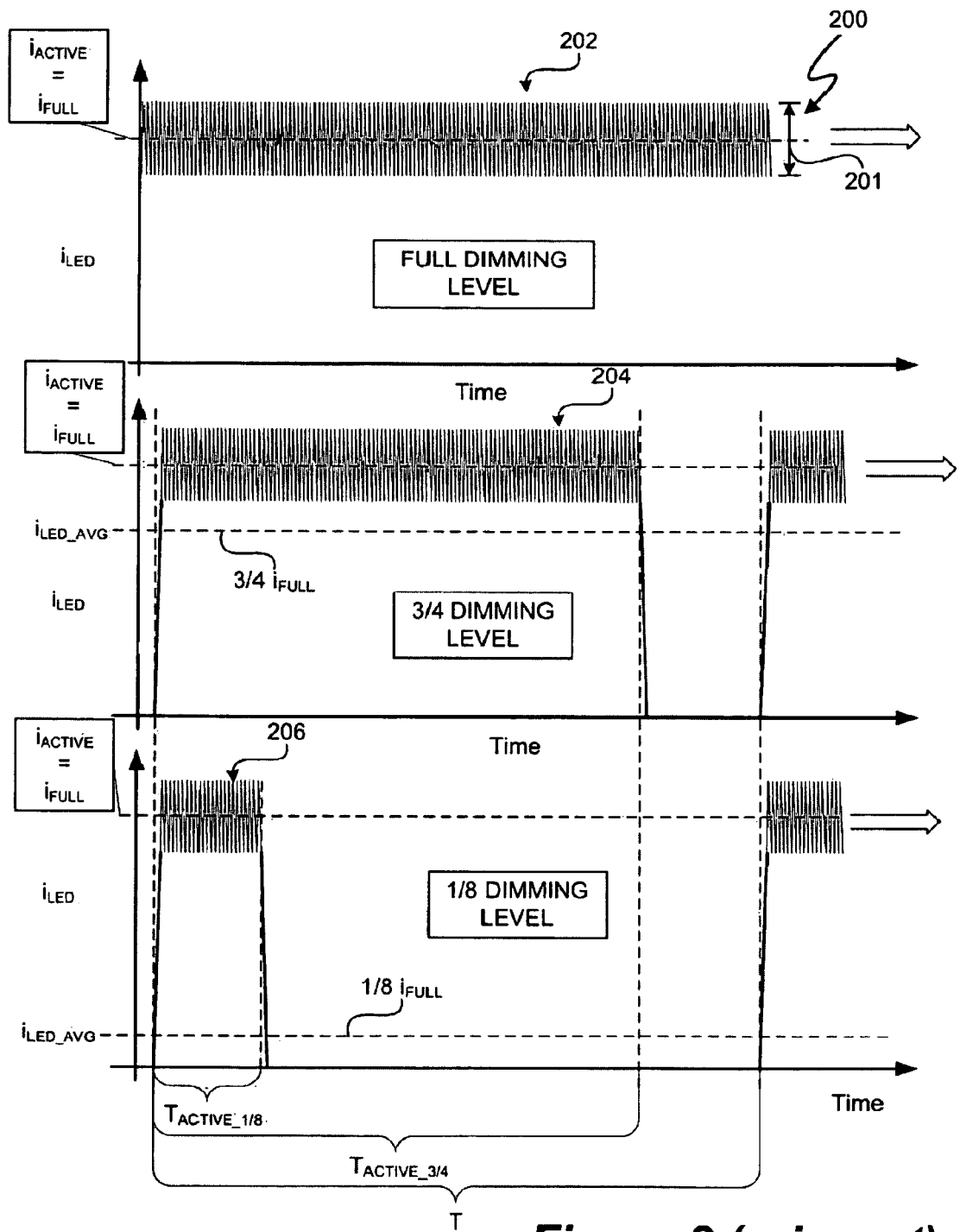
FIG. 2 (labeled prior art) depicts a graphical representation of LED current in the LED lighting system of FIG. 1 for various dimming levels.
Figure 3:
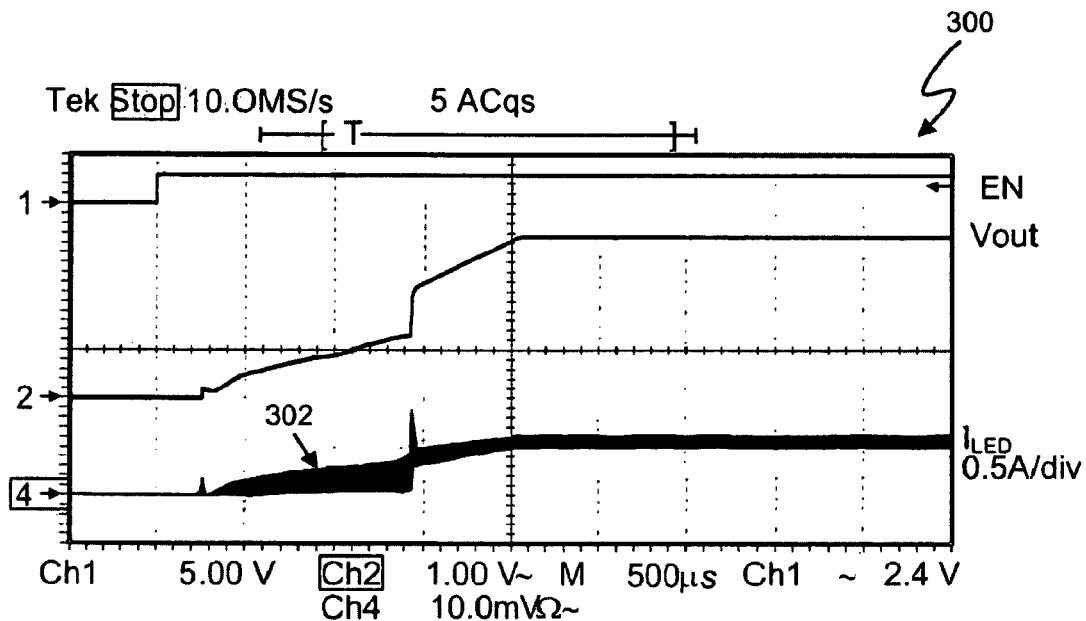
FIG. 3 (labeled prior art) depicts a graphical relationship between an enable signal, output voltage, and LED current plotted against dimming voltage values for a prior art LED switch mode controller.
Figure 4:
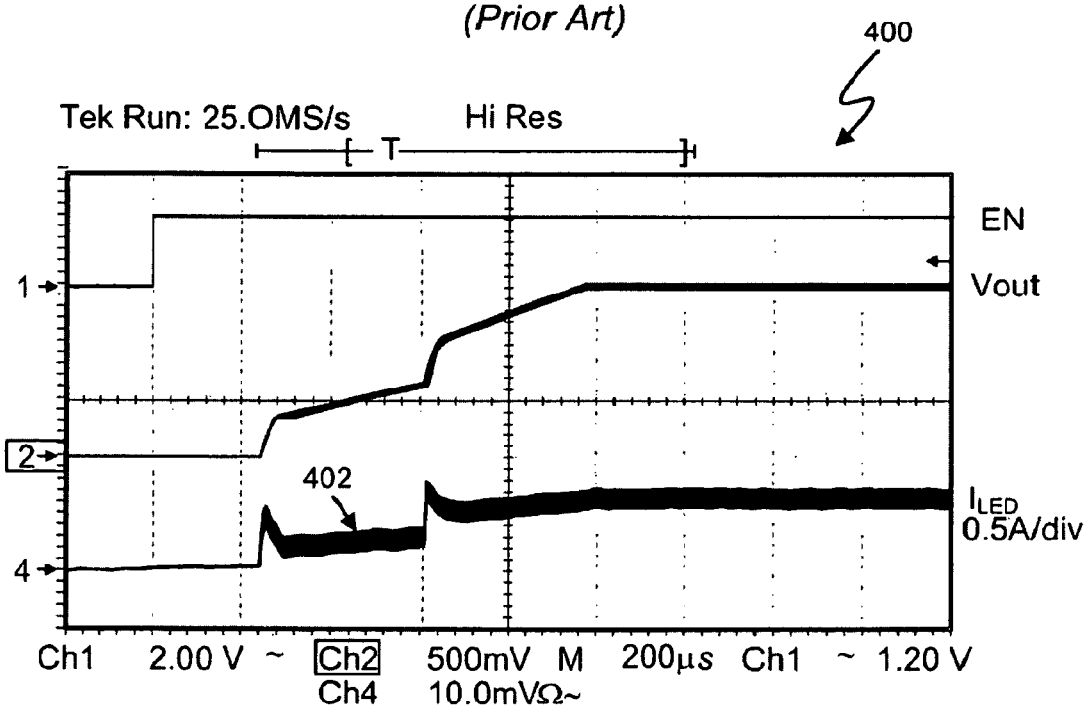
FIG. 4 (labeled prior art) depicts another graphical relationship between an enable signal, output voltage, and LED current plotted against dimming voltage values for a prior art LED switch mode controller.
Figure 5:
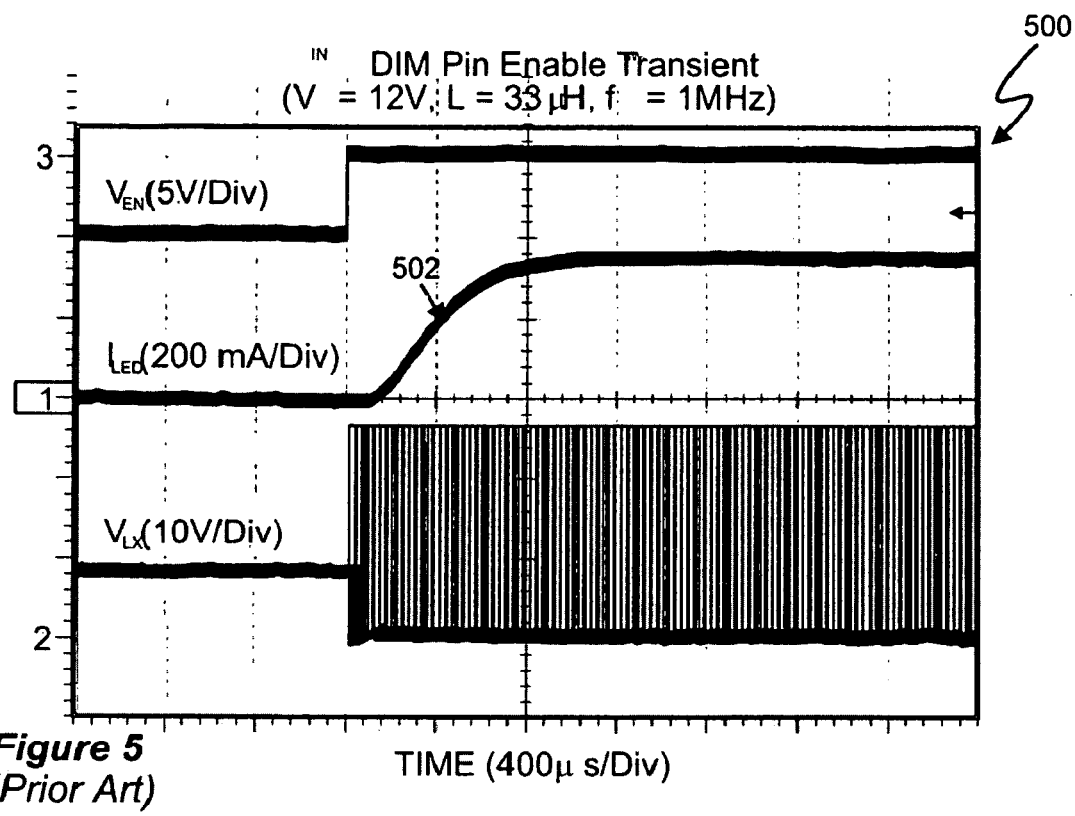
FIG. 5 (labeled prior art) depicts a graphical relationship between an enable signal, output voltage, and LED current plotted against time for another prior art LED switch mode controller showing the ramp-up of the LED current.
Figure 6:
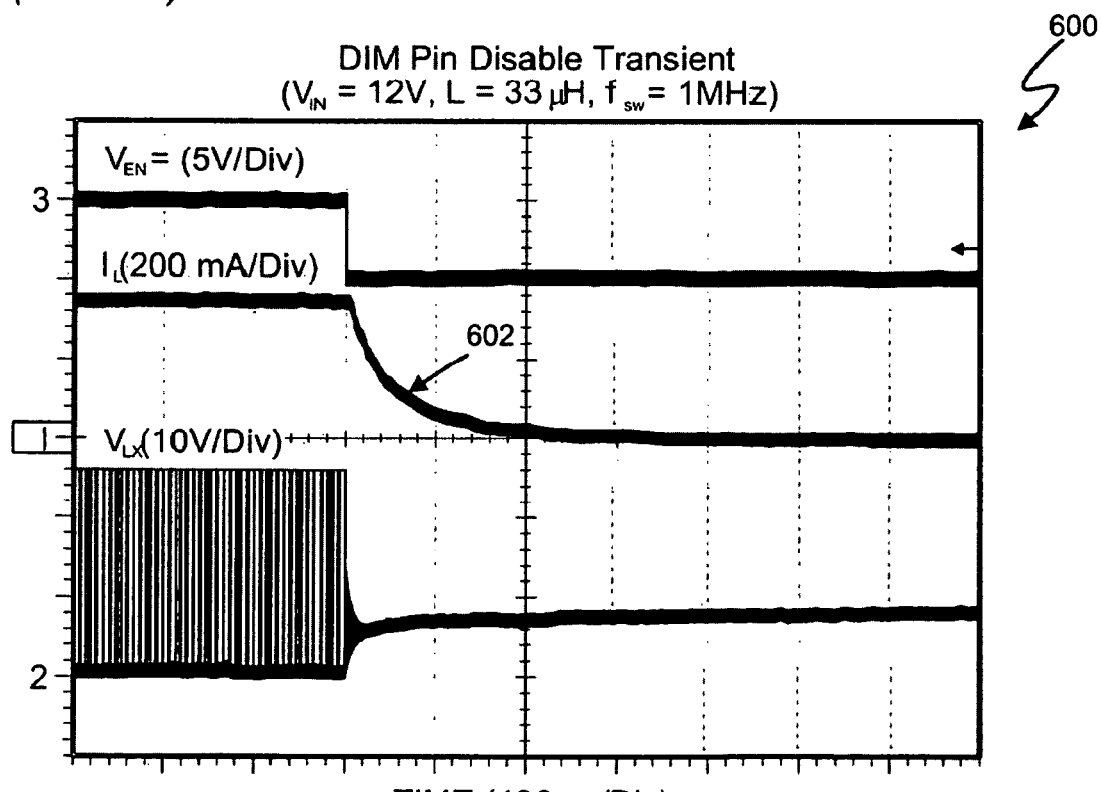
FIG. 6 (labeled prior art) depicts another graphical relationship between an enable signal, output voltage, and LED current plotted against time for the prior art LED switch mode controller which is the ramp-down of the LED current shown in FIG. 5.
Figure 7:
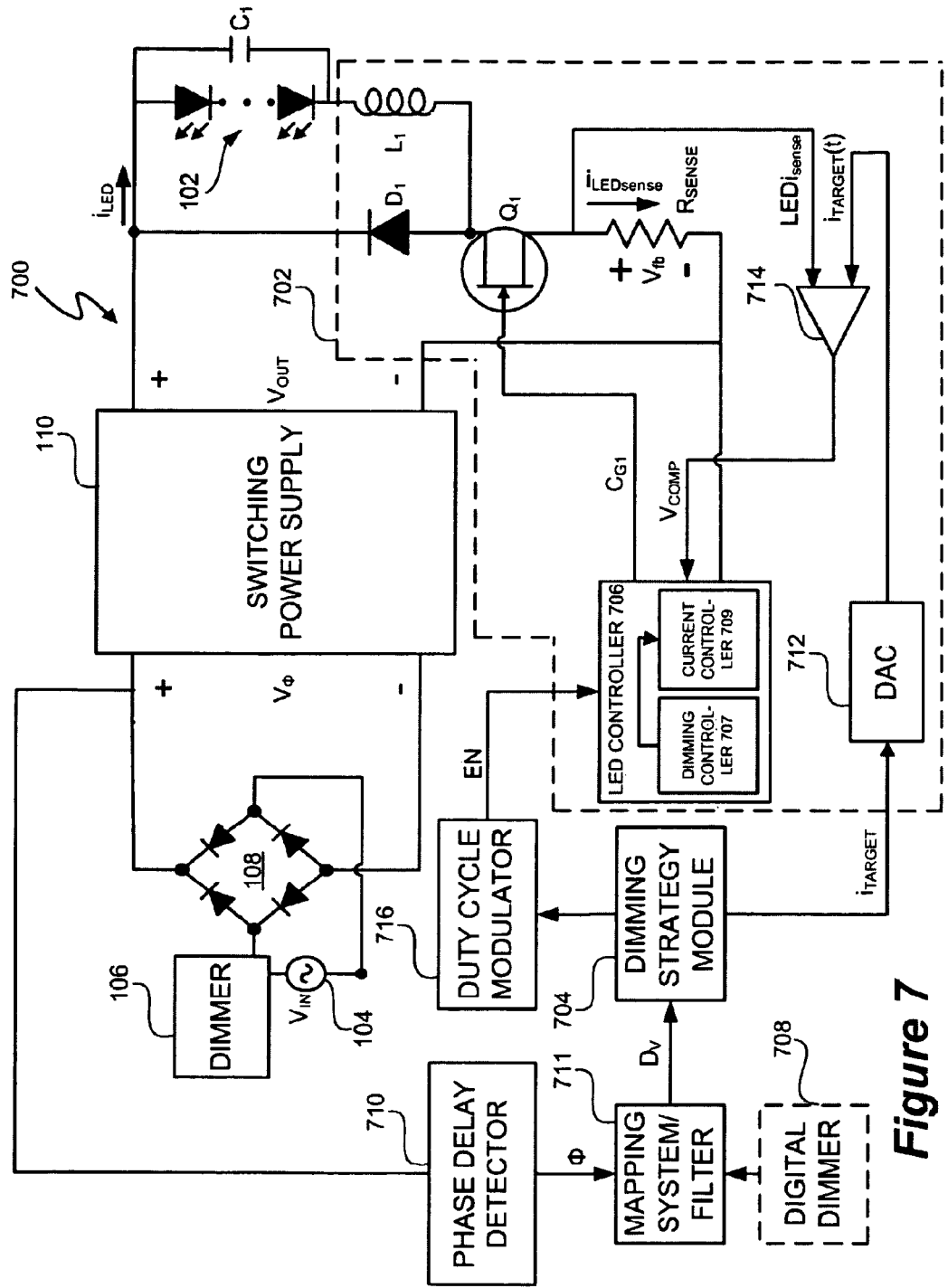
FIG. 7 depicts an LED lighting system having accurate current control in accordance with the present invention.

FIG. 7 depicts an LED lighting system 700 that includes a current control system 702 to control the LED current $i_{LED}$. The LED lighting system 700 also includes a dimming strategy module 704 to vary and modulate an active value of LED current $i_{LED}$ in response to varying dimming levels and in accordance, with a dimming strategy described subsequently in more detail. In at least one embodiment, the LED lighting system 700 also includes the voltage source 104, dimmer 106, rectifier 108, and switching power supply 110, which operate as previously described.

The current control system 702 (shown in a dotted-line border) includes an LED controller 706 to generate a duty cycle modulated gate control signal $C_{G1}$ to control conductivity of FET Q1 and, thus, control LED current $i_{LED}$. LED controller 706 includes a dimming controller 707 and current controller 709. Dimming controller 707 drives current controller 709. Dimming controller 707 can be a pulse width modulation (PWM) dimming controller or a delta-sigma modulated dimming controller. Control signal $C_{G1}$ charges and discharges a gate of FET $Q_1$. A logical 1 value (e.g., a first state) of control signal $C_{G1}$ causes FET $Q_1$ to conduct and draw LED current $i_{LED}$ through an LED system that comprises a number of LEDs 102 and also through an inductor L1. A logical 0 value of control signal $C_{G1}$ causes FET Q1 to be non-conductive (e.g., a second state). FET $Q_1$ represents one embodiment of a switch and can be replaced by any type of switch.

In at least one embodiment, the LED lighting system 700 dims the LED system (e.g., the LEDs 102) in conformity with a dimming level input generated by a dimmer such as phase cut dimmer 106. The number of LEDs 102 is a matter of choice. LEDs 102 can be replaced by a single LED. The LED lighting system 700 can receive dimmer signals indicating dimming levels from LEDs 102 from any type of dimmer. For example, dimmer 106 can be omitted, and LED lighting system 700 can include a dimmer, such as digital dimmer 708 or a dimmer 106 having a direct current (DC) dimming control voltage (not shown). In at least one embodiment, the digital dimmer 708 is a digital addressable lighting interface (DALI) compatible dimmer. Digital dimmer 708 is depicted with "dashed" lines because generally LED lighting system 700 includes one dimmer or another dimmer but not two dimmers. Thus, in at least one embodiment, digital dimmer 708 is a substitute for dimmer 106 and phase delay detector 710. The dimmers, such as dimmer 106 and digital dimmer 708, receive inputs, either manually or automatically, that set the dimming level values to be output by the dimmers.

In at least one embodiment, the LED controller 706 responds to a dimming level input and generates the control signal $C_{G1}$ in accordance with a dimming strategy that, in at least one embodiment, includes two modes of operation. In an active value varying mode of operation, the LED controller 706 varies an active value of the LED current $i_{LED}$ in conformity with the dimming level for a first set of dimming levels. In an active value, duty cycle modulation mode of operation, the LED controller 706 modulates a duty cycle of an active value of the LED current $i_{LED}$ in conformity with the dimming level for a second set of dimming levels.

To determine, which of the two modes of operation is to be used in generating the LED current $i_{LED}$, LED lighting system 700 first detects a dimming level for LEDs 102. When LED lighting system 700 includes dimmer 106, the LED lighting system 700 also includes a phase delay detector 710 to detect phase delays in the phase modulated signal $V_\Phi$. The phase delay detector 710 generates a phase delay signal $\Phi$, and the phase delays represented by the digital phase delay signal $\Phi$ represent dimming levels. Melanson III describes an exemplary embodiment of phase delay detector 710.

In at least one embodiment, the LED lighting system 700 also includes an optional mapping system and filter 711 to map the dimming levels indicated by the phase delay signal $\Phi$ to predetermined digital values of dimming signal $D_V$. Melanson IV describes an exemplary mapping system and filter 711 that maps values of dimming signal $D_V$ to perceived light levels. The LED lighting system 700 receives the dimming signal $D_V$ as a dimming level input. In at least one embodiment, LED lighting system 700 omits the mapping system and filter 711, and the dimming strategy module 704 receives the phase delay signal $\Phi$ as a direct, digital dimmer signal input having values indicating dimming levels.

Figure 8:
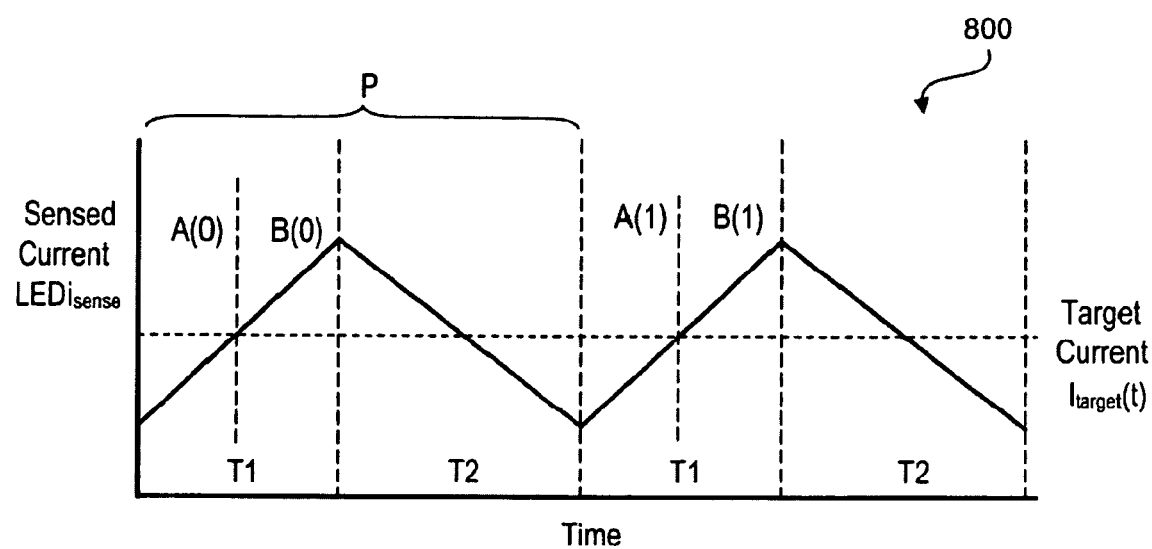
FIG. 8 depicts a timing diagram for the current controller of the controlled LED lighting system which implements the principles of the present invention.

FIG. 8 depicts an exemplary timing diagram for the dimming controller 707 and/or the current controller 709 of LED controller 706 within controlled LED lighting system 700. Dimming controller 707 and current controller 709 can each be implemented as a time-based controller that controls FET $Q_1$ such that the output voltage $V_{out}$ of controlled LED lighting system 700 has a desired average value. Because the control applied to FET $Q_1$ by time-based dimming controller 707 or time-based current controller 709 always causes controlled LED lighting system 700 to integrate up or down (e.g., integration response), time-based dimming controller 707 of time-based current controller 709 is said to apply bang-bang control.

As indicated by its name, time-based dimming controller or time-based current controller 709 implements a time-based control methodology, rather than one of the conventional magnitude-based control methodologies. Time-based dimming controller 707 or time-based current controller 709 receives a compared voltage $V_{COMP}$ which is a comparison of sensed signal $LEDi_{sense}$ indicative of a current or voltage (e.g., sense current $i_{LEDsense}$) in controlled LED lighting system 700 and a target or reference signal $i_{target}(t)$, such as an analog or digital current or an analog or digital voltage provided from dimming strategy module 704. In the depicted timing diagram, sensed signal $LEDi_{sense}$ is, for example, the current $i_{LEDsense}$ sensed at the drain of FET Q1 going through resistor $R_{sense}$, as shown in FIG. 7, and the target current $i_{target}(t)$ is a target current $i_{TARGET}$ provided from dimming strategy module 704. Of course, in alternative embodiments, sensed signal $LEDi_{sense}$ and the target signal $i_{target}(t)$ may both be voltages.

While a control signal $C_{G1}$ supplied to the LED system (LEDs 102) is in a first state (e.g., such as an on-state), a polarity change in a comparison of the sensed signal $LEDi_{sense}$ and the target/reference signal $i_{target}(t)$ is detected at a first time. Based on the first time, a second time is determined at which to change a state of the control signal $C_{G1}$ supplied to the LED system (LEDs 102). At the determined second time, the state of the control signal $C_{G1}$ supplied to the LED system (LEDs 102) is changed from the first state to a second state (e.g., such as an off-state).

In FIG. 8, sensed signal $LEDi_{sense}$, which is either rising or falling at all times (e.g., polarity change), has repeating cycles of period P each comprising an interval T1 in which sensed signal $LEDi_{sense}$ is rising and an interval T2 in which sensed signal $LEDi_{sense}$ is falling. Each interval T1 in turn comprises an interval A (e.g., A(0), A(1), etc.) during which sensed signal $LEDi_{sense}$ rises from a cycle initial value (e.g., one state) to the target signal $i_{target}(t)$ and a subsequent interval B during which sensed signal $LEDi_{sense}$ rises from the target signal $i_{target}(t)$ to a cycle maximum value (e.g., another state). Sensed signal $LEDi_{sense}$ falls from the cycle maximum value to the initial value of the next cycle during interval T2. For clarity, intervals A and B are identified with ascending numerical cycle indices (A(0), A(1), etc. and B(0), B(1), etc.).

In accordance with the present invention, time-based dimming controller 707 or time-based current controller 709 can control FET $Q_1$ to implement any of a number of time-based control methodologies. For example, time-based dimming controller 707 or time-based current controller 709 can implement constant period control so that period P is constant (and intervals T1 and T2 vary between cycles), or constant on-time control so that interval T1 is constant (and period P and interval T2 vary between cycles), or constant off-time control so that interval T2 is constant (and period P and interval T1 vary between cycles). A desired methodology may be selected, for example, to reduce electromagnetic interference (EMI) with surrounding circuitry.

The simplest control methodology, which also enables an immediate lock to the target signal $i_{target}(t)$, is a constant on-time or constant off-time approach in which one of intervals T1 or T2 is of constant duration and the other interval (and period P) varies in duration. In a constant off-time control methodology, time-based dimming controller 707 or time-based current controller 709 controls FET $Q_1$ such that the interval A of interval 11 during which the sensed signal $LEDi_{sense}$ is less than the target signal $i_{target}(t)$ and the interval B of interval T1 during which the sensed signal $LEDi_{sense}$ is, greater than the target signal $i_{target}(t)$ are equal. According to this constant off-time control methodology, the duration of interval B for each cycle is determined in accordance with the following equation 1:

$$B(N)=[B(N-1)+A(N)]/2, \quad \text{(Equation 1)}$$

where N is the cycle index. Thus, for example, utilizing Equation 1, time interval B(1) is equal to the average of time intervals B(0) and A(1). Interval T2 is, of course, fixed in duration.

The constant on-time control methodology employs the same equation as the constant off-time approach, except that in the constant on-time approach, interval T1 is of constant duration, interval A is the portion of interval T2 in which the sensed signal $LEDi_{sense}$ exceeds the target signal $i_{target}(t)$, and interval B is the portion of interval T2 in which the sensed signal $LEDi_{sense}$ is less than the target signal $i_{target}(t)$. Time-based current controller 709 again controls FET $Q_1$ such that intervals A and B are of equal duration.

Figure 9:
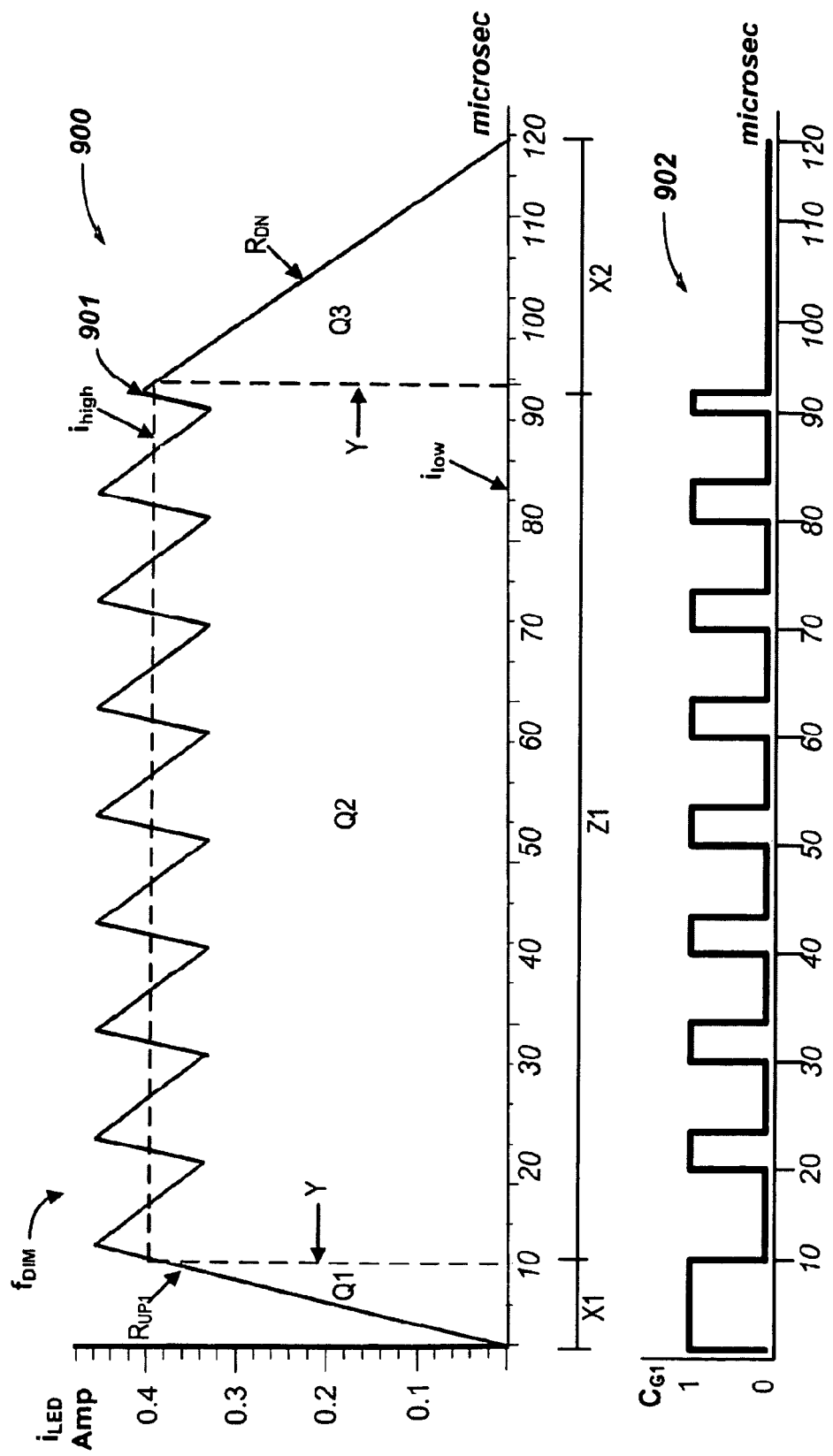
FIG. 9 depicts time plots showing a current active period of the LED current in which a Pulse Width Modulation (PWM) control signal controls the current levels of the LED current over the active time period of the LED current time period.

With reference now to FIG. 9, a current-time plot 900 and a control signal time plot 902 are shown. An LED current time period for an LED current $i_{LED}$ includes both active time periods and inactive time periods. An exemplary active time period of an LED current time period utilized by controlled lighting system 700 for dimming control is shown in current-time plot 900. A Pulse Width Modulation (PWM) switching control signal $C_{G1}$ is shown in control signal time plot 902 plotted over the same active period (e.g., from 0 to 120 microseconds). The PWM switching control signal $C_{G1}$ controls the current levels of the LED current $i_{LED}$ over the active time period for controlling the dimming levels of the LEDs 102. The active time period is generally defined as an LED current pulse (e.g., LED current pulse 901), that is, from when the current level of the LED current $i_{LED}$ ramps up to and fluctuates at an average high current value $i_{high}$ (e.g., 0.45 Amp) and through and until the time when the current level of the LED current $i_{LED}$ ramps down to a low current value $i_{low}$ (e.g., 0 Volts).

As shown in FIG. 9, the PWM switching frequency $f_{SW}$ for the PWM control signal $C_{G1}$ is different than the PWM dimming frequency rate $f_{DIM}$ for the LED current $i_{LED}$ for controlling dimming levels of LEDs 102 over time. Thus, for the operations of LED lighting system 700, two different PWM operating frequencies are respectively being utilized for the control signal $C_{G1}$ and the dimming control (e.g., control of the levels of LED current $i_{LED}$). Exemplary operating frequencies for PWM dimming frequency rate $f_{DIM}$ widely ranges from 100 Hz to 20 kHz. The PWM dimming frequency rate $f_{DIM}$ is provided by duty cycle modulating the LED current time period at a rate of greater than fifty (50) Hz. Exemplary operating frequencies for PWM switching frequency $f_{SW}$ range from 50 kHz to 250 kHz.

In FIG. 9, while control signal $C_{G1}$ turns on and has a high value (e.g., 1), LED current $i_{LED}$ ramps up during 0 microsec. to 12.5 microsec. in accordance to ramp-up slope $R_{UP1}$ and charges up to 0.45 Amp. When control signal $C_{G1}$ turns off and has a low value (e.g., 0), LED $i_{LED}$ starts decreasing from 0.45 Amp through 0.4 Amp and reaches 0.35 Amp at which point control signal $C_{G1}$ turns back on and has a high value (e.g., 1). The current level of LED current $i_{LED}$ continues to fluctuate in this manner (e.g., between 0.45 Amp and 0.35 Amp) in accordance with the pulses (e.g., turning on and off FET $Q_1$ of LED lighting system 700) of control signal $C_{G1}$. The fluctuations of the LED current level span from 12.5 microsec. through 92.5 microsec.

From 92.5 microsec. to 120 microsec., the current level of LED current $i_{LED}$ ramps down in accordance with ramp-down slope $R_{DN1}$ from 0.4 Amp to 0 Amp since control signal $C_{G1}$ is turned off and stays at 0. The actual charge amount $C_{Actual}$ for LED current pulse 901 is calculated as follows:

$$Q_{actual}=Q1+Q2+Q3 \quad \text{Equation 2}$$

The following charge amounts are determined by the following area calculations:

$$Q1=\frac{1}{2}*(X1*Y)=\frac{1}{2}*((12.5-0)*0.4)=2.5 \text{ μCoulombs} \quad \text{Equation 3}$$

$$Q2=Z1*Y=(92.5-12.5)*0.4=32 \text{ μCoulombs} \quad \text{Equation 4}$$

$$Q3=\frac{1}{2}*(X2*Y)=\frac{1}{2}*((120-92.5)*0.4)=5.5 \text{ μCoulombs} \quad \text{Equation 5}$$

Thus, the total actual charge amount $Q_{Actual}$ for LED current pulse 901 is:

$$Q_{Actual}=2.5+32+5.5=40 \text{ μCoulombs} \quad \text{Equation 6}$$

However, due to discrete limitations (e.g., discrete time/steps) of charge quantization, the total actual charge amount $Q_{Actual}$ for an active time period (e.g., LED current pulse 901) may differ from what a total desired charge amount $Q_{Desire}$ is. Thus, the total desired charge amount $Q_{Desire}$ that is desired to be delivered to LEDs 102 is calculated as follows:

$$Q_{Desire}=Q1+Q2+Q3\pm Q_{error} \quad \text{Equation 7}$$

The quantization error charge amount $Q_{error}$ may be a deficient charge amount or an excess charge amount depending on what the total desired charge amount $Q_{Desire}$ is relative to what the total actual charge amount $Q_{Actual}$ that can actually be delivered. If the quantization error charge amount $Q_{error}$ is a deficient charge amount, then the quantization error charge amount $Q_{error}$ is compensated by adding the equivalent charge amount in during a next or future time period (e.g., future LED current pulse) of LED current time period. For example, if the actual charge amount is 40 μCoulombs, but 41 μCoulombs is the desired charge amount $Q_{Desire}$ and cannot be achieved due to charge quantization limitations, then the quantization error charge amount $Q_{error}$ is a deficiency of 1 μCoulomb (e.g., $Q_{error}=Q_{Actual}-Q_{Desire}=40$ μCoulombs−41 μCoulombs=−1 μCoulomb). In this case, 1 μCoulomb is added in during a next of future time period to compensate the actual charge amount $Q_{Actual}$ for the desired charge amount $Q_{Desire}$. On the other hand, if the quantization error charge amount $Q_{error}$ is an excess charge amount, then the quantization error charge amount $Q_{error}$ is compensated by subtracting an equivalent charge amount from a next or future, time period (e.g., future LED current pulse) of LED current time period. For example, if the actual charge amount is 40 μCoulombs, but 39 μCoulombs is the desired charge amount $Q_{desire}$ and cannot be achieved due to charge quantization limitations, then the quantization error charge amount $Q_{error}$ is an excess amount of 1 μCoulomb (e.g., $Q_{error}=Q_{Actual}-Q_{Desire}=40$ μCoulombs−39 μCoulombs=+1 μCoulomb). In this case, 1 μCoulomb is subtracted from a next of future time period to compensate the actual charge amount $Q_{Actual}$ for the desired charge amount $Q_{Desire}$.

The process for modifying charge amounts delivered at a future time (e.g., modifying the charge amounts for future LED current pulses) as discussed for FIG. 9 can be appropriately repeated for subsequent LED current pulses. In the same manner for subsequent LED current pulses, charge amounts would be respectively Compensated by adding to or subtracting from charge amounts of future LED current pulses depending upon whether the error charge amount is respectively a deficient or excess charge amount relative to the desired charge amount.

Figure 10:
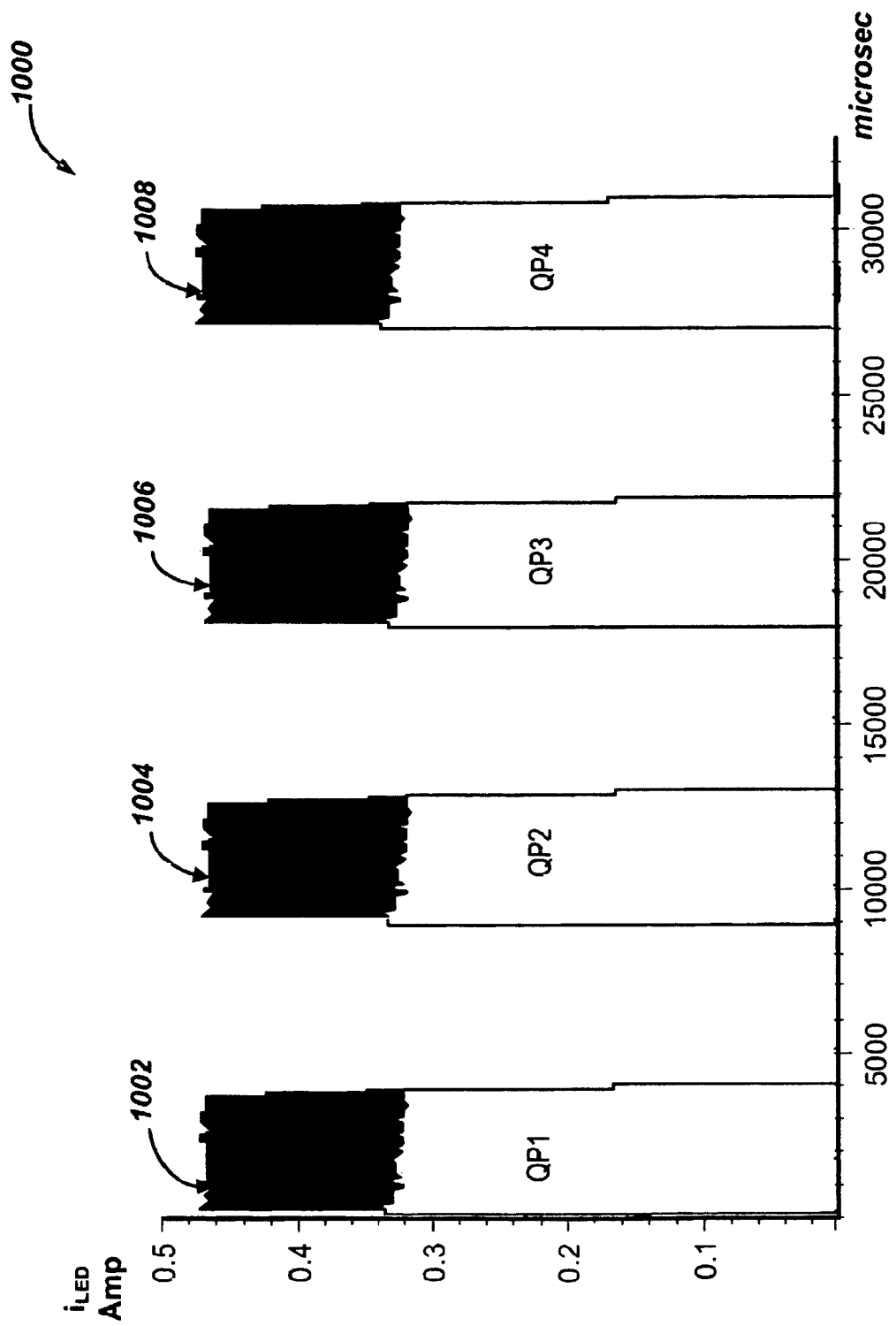
FIG. 10 depicts a time plot of LED current showing an exemplary train of active and inactive periods for the LED current controlled by a pulse width modulated dimming controller.

The dimming controller 707 can be a pulse width modulation (PWM) dimming controller or can be a delta-sigma dimming controller. Referring now to FIG. 10, a time plot 1000 of LED current shows an exemplary train of LED current pulses (e.g., current pulses 1002, 1004, 1006, and 108) that are indicative of active time periods of an LED current $i_{LED}$. The time plot 1000 also shows the inactive periods generally equally spaced apart between the LED current pulses since the dimming controller 707 is a pulse width modulated dimming controller. Error charge amounts that occur during an earlier active time period is compensated during a subsequent or future active time period. In other words, an error charge amount that occurs during current pulse 1002 is compensated during current pulse 1004, and an error charge amount occurring during current pulse 1004 is compensated during current pulse 1006. An error charge amount occurring during current pulse 1006 is compensated during current pulse 1008.

Figure 11:
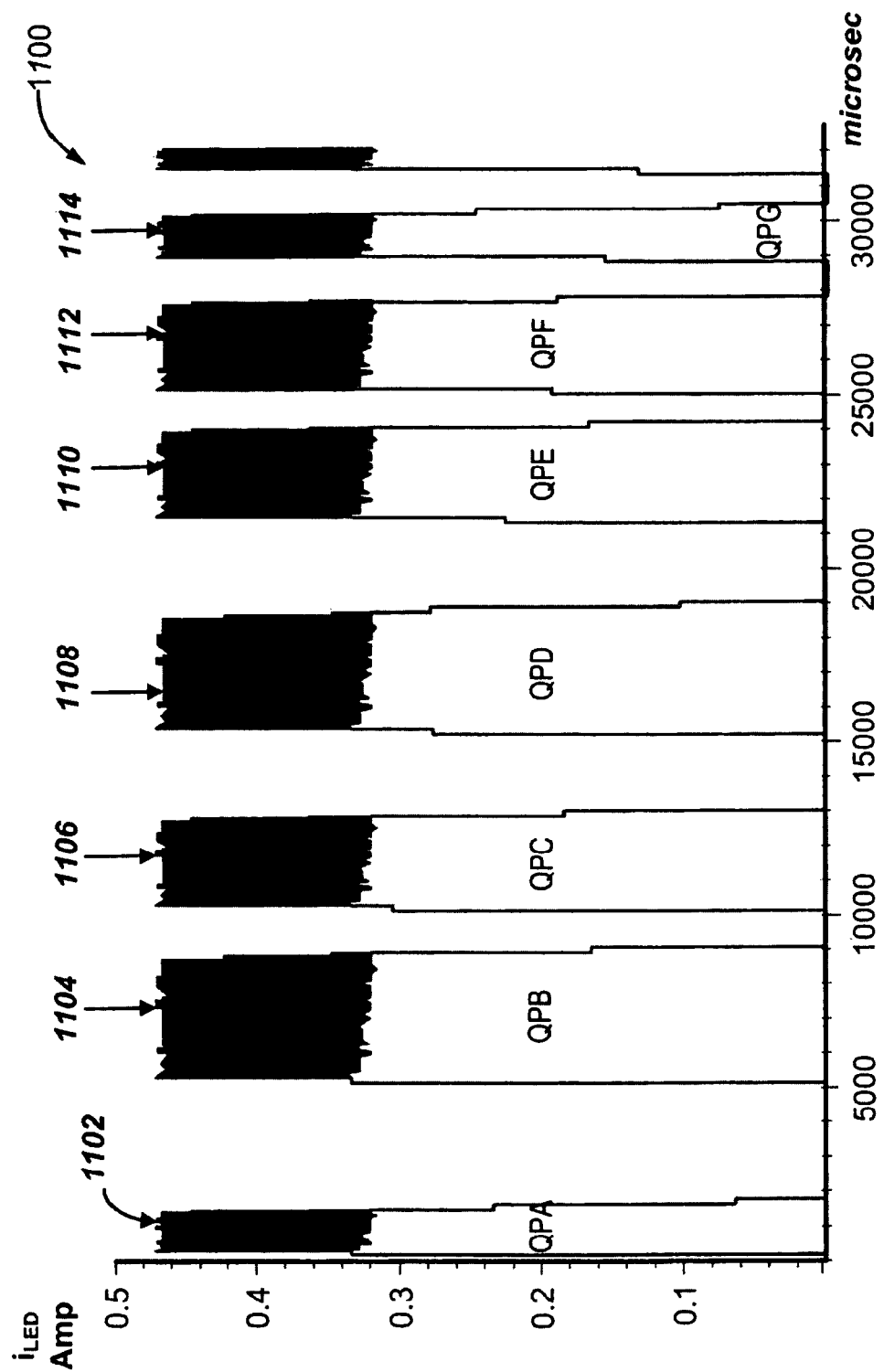
FIG. 11 depicts a time plot of LED current showing an exemplary train of active and inactive periods for the LED current controlled by a delta sigma modulated dimming controller.

Referring now to FIG. 11, a time plot 1100 of LED current shows an exemplary train of LED current pulses (e.g., current pulses 1102, 1104, 1106, 1108, 1110, 1112, 1114) that are indicative of active periods of an LED current $i_{LED}$. The time plot 1100 also shows the inactive periods non-uniformly spaced apart between the LED current pulses since the dimming controller 707 is a delta-sigma modulated dimming controller. Again, error charge amounts that occur during an earlier active time period is compensated during a subsequent or future active time period. In other words, an error charge amount that occurs during current pulse 1102 is compensated during current pulse 1104, and an error charge amount occurring during current pulse 1104 is compensated during current pulse 1106 and so on and so forth. As shown in FIG. 11, the pulses 1102, 1104, 1106, 1108, 1110, 1112, 1114 may be the same or different in duration and may or may not be generally uniformly spaced apart.

The use of a delta-sigma modulated dimming controller 707 instead of a PWM dimming controller 707 for controlling the LED current $i_{LED}$ in FIG. 7 provides the characteristic of broadening the signal spectrum, which minimizes the potential for audible tones. A simple second order modulator, with reasonable dither level, may be implemented for the delta-sigma modulator, and such an implementation is generally sufficient and relatively inexpensive to implement. For example, the switching frequency $f_{SW}$ may be 200 kHz while the delta-sigma dimming frequency rate $f_{DIM}$ may be 20 kHz. In this case, a minimal chance for any audio noise production exists. However, a switching current control with rapid response, as it is turned on and off at a fast rate, is needed. Thus, a time-based dimming controller 707 and a time-based current controller 709 as discussed earlier for FIG. 7 provide such a fast switching response.

Thus, the actual charge amount delivered to the LEDs 102 is calculated. The charge accumulation is compared to the desired charge amount. Modification and compensation of the total charge amount delivered to the LEDs 102 can be continuously and constantly performed, which can at least compensate for error charge amounts. Regardless of the characteristics of the start-up and start-down of the LED controller 706, the LED lighting system 700 will properly compensate and allows for a much faster PWM switching rate $f_{SW}$. Such a feature allows for smooth dimming of LEDs 102 by LED lighting system 700.

Exemplary pseudo-code for PWM operation of dimming control 707 is provided as follows:

```
Dim level D, 0-1
Qint charge accumulation, initialized to 0
PWM period PP
Full-scale current Itarget
Current control sample period PCC
Instantaneous LED current LEDI
At PP rate, Qint = Qint + D* Itarget
At PCC,
Qint = Qint − PCC * LEDI
If Qint>0, turn on LED controller
If Qint<=, turn off LED controller
```

Although the present invention has been described in detail, it should be understood that various changes, substitutions and alterations can be made hereto without departing from the spirit and scope of the invention as defined by the appended claims.

What is claimed is:

1. A light emitting diode (LED) lighting system comprising:
    an LED controller to control a current in an LED system, wherein the LED controller includes components to:
        calculate, based on the current and an active time period of an LED current time period, an actual charge amount delivered to the LED system wherein the LED current time period is duty cycle modulated at a rate of greater than fifty (50) Hz; and
        utilize the actual charge amount to modify and provide a desired target charge amount to be delivered during a future active time period Of the LED current time period.

2. The LED lighting system of claim 1 wherein the LED controller controls dimming of the LED system.

3. The LED lighting system of claim 2 wherein the LED controller controls dimming of the LED system over a wide dimming frequency range.

4. The LED lighting system of claim 1 wherein the components to utilize the actual charge amount to modify and provide a desired target charge amount to be delivered during a future active time period further comprises:
    components to compare the actual charge amount to a desired charge amount for the active time period and compensate for a difference between the actual charge amount and the desired charge amount during the future active time period.

5. The LED lighting system of claim 4 wherein the LED controller controls dimming of the LED system.

6. The LED lighting system of claim 5 wherein the LED controller comprises a dimming controller and a current controller wherein the dimming controller drives the current controller.

7. The LED lighting system of claim 6 wherein the dimming controller is driven by a dimming rate and the current controller is driven by a switching frequency rate and wherein the dimming rate is different than the switching frequency rate.

8. The LED lighting system of claim 7 wherein the dimming controller is a pulse width modulation (PWM) dimming controller.

9. The LED lighting system of claim 7 wherein the dimming controller is a delta-sigma modulator dimming controller.

10. The LED lighting system of claim 1 wherein the LED system comprises a number of LEDs.

11. A method for controlling a current in a light emitting diode (LED) system of an LED lighting system comprising:
    duty cycle modulating the LED current time period at a rate of greater than fifty (50) Hz;
    calculating, based on the current and an active time period of an LED current time period, an actual charge amount delivered to the LED system; and
    utilizing the actual charge amount to modify and provide a desired target charge amount to be delivered during a future active time period of the LED current time period.

12. The method according to claim 11 further comprising:
    comparing the actual charge amount to a desired charge amount for the active time period; and
    compensating for a difference between the actual charge amount and the desired charge amount during the future active time period.

13. The method according to claim 12 wherein the method for controlling a current controls dimming of the LED system.

14. A current controller for controlling current to a light emitting diode (LED) system for an LED lighting system comprising:
    components for receiving a dimming level signal from a dimming controller and for controlling and providing, based on the dimming level signal, an amount of drive current for driving the LED system; and
        wherein the components are at least part of an LED controller to:
            calculate, based on the current and an active time period of the LED current time period, an actual charge amount delivered to the LED system wherein the LED current time period is duty cycle modulated at a rate of greater than fifty (50); and
            utilize the actual charge amount to modify and provide a desired target charge amount to be delivered during a future active time period of the LED current time period.

15. The current controller according to claim 14 wherein the current controller is operated at a switching frequency.

16. , The current controller according to claim 14 wherein the current controller is a time-based controller for a controlled system.

17. The current controller according to claim 16 wherein the LED lighting system has an integration response and wherein the time-based controller further comprises:
    a comparator that, while a control signal supplied to the LED system has a first state, detects, at a first time, a polarity change in a comparison of a sensed signal from the LED system and a reference signal;
    time calculation logic that, based upon the first time, determines a second time at which to change a state of a control signal supplied to the LED system; and
    a modulator that, at the determined second time, changes the state of the control signal supplied to the LED system from the first state to a second state.

18. A method for controlling current to a light emitting diode (LED) system for an LED lighting system comprising:
    receiving a dimming level signal from a dimming controller; and
    controlling and providing, based on the dimming level signal, an amount of drive current for driving the LED system; and
    wherein the receiving and controlling and providing steps are at least part of an LED controller method to:
        duty cycle modulate an LED current time period at a rate of greater than fifty (50) Hz;
        calculate, based on the current and an active time period of the LED current time period, an actual charge amount delivered to the LED system; and
        utilize the actual charge amount to modify and provide a desired target charge amount to be delivered during a future active time period of the LED current time period.

19. The method according to claim 18 wherein the LED lighting system has an integration response, said method comprising:
    while a control signal supplied to the LED system is in a first state, detecting at a first time a polarity change in a comparison of a sensed signal from the LED system and a reference signal;
    based upon the first time, determining a second time at which to change a state of a control signal supplied to the LED system; and
    at the determined second time, changing the state of the control signal supplied to the LED system from the first state to a second state.

20. A delta-sigma modulated dimming controller for controlling a dimming level of a light emitting diode (LED) system for an LED lighting system comprising:
    components for receiving a dimming control signal and driving a dimming level signal to a current controller for providing a current for driving the LED system; and
    wherein the components are at least part of an LED controller to:
        calculate, based on the current and an active time period of an LED current time period, an actual charge amount delivered to the LED system wherein the LED current time period is duty cycle modulated at a rate of greater than fifty (50) Hz; and
        utilize the actual charge amount to modify'and provide a desired target charge amount to be delivered during a future active time period of the LED current time period.

21. The delta-sigma modulated dimming controller according to claim 20, wherein the current controller controls and provides, based on the dimming level signal, an amount of drive current for driving the LED system.

22. A method for controlling a dimming level of a light emitting diode (LED) system for an LED lighting system utilizing a delta sigma modulator comprising:
    receiving a dimming control signal; and
    driving a dimming level signal to a current controller for providing a current for driving the LED system; and
    wherein the receiving and driving steps are at least part of an LED controller method to:
        duty cycle modulate the LED current time period at a rate of greater than fifty (50) Hz;
        calculate, based on the current and an active time period of an LED current time period, an actual charge amount delivered to the LED system; and
        utilize the actual charge amount to modify and provide a desired target charge amount to be delivered during a future active time period of the LED current time period.

23. The method according to claim 22, further comprises controlling and providing, by the current controller based on the dimming level signal received, an amount of drive current for driving the LED system.

* * * * *